United States Patent
Ebihara et al.

(10) Patent No.: US 12,470,851 B2
(45) Date of Patent: Nov. 11, 2025

(54) DISTRIBUTED RAMP LINEARITY COMPENSATION CIRCUIT

(71) Applicant: OMNIVISION TECHNOLOGIES, INC., Santa Clara, CA (US)

(72) Inventors: Hiroaki Ebihara, San Jose, CA (US); Nobuhiro Yanagisawa, San Jose, CA (US); Satoshi Sakurai, Cupertino, CA (US); Tomoyasu Tate, Cupertino, CA (US); Naoki Kitazawa, Yokohama (JP); Kohei Harada, Yokohama (JP)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 177 days.

(21) Appl. No.: 18/363,469

(22) Filed: Aug. 1, 2023

(65) Prior Publication Data

US 2025/0048002 A1   Feb. 6, 2025

(51) Int. Cl.
*H04N 25/78* (2023.01)
*H04N 25/709* (2023.01)
*H04N 25/76* (2023.01)

(52) U.S. Cl.
CPC ........... *H04N 25/78* (2023.01); *H04N 25/709* (2023.01); *H04N 25/7795* (2023.01)

(58) Field of Classification Search
CPC ... H04N 25/78; H04N 25/709; H04N 25/7795
See application file for complete search history.

(56) References Cited

U.S. PATENT DOCUMENTS

| | | | |
|---|---|---|---|
| 9,307,173 B2 | 4/2016 | Takamiya | |
| 10,826,470 B2* | 11/2020 | Zuo | H04N 25/709 |
| 2011/0279723 A1* | 11/2011 | Takamiya | H03M 1/0612 |
| | | | 348/308 |
| 2022/0321815 A1* | 10/2022 | Sun | H03K 4/90 |
| 2024/0214551 A1* | 6/2024 | Tabata | H04N 25/78 |

OTHER PUBLICATIONS

U.S. Appl. No. 18/363,473, filed Aug. 1, 2023, Zuo et al.

* cited by examiner

*Primary Examiner* — Nhan T Tran
(74) *Attorney, Agent, or Firm* — Dorsey & Whitney LLP

(57) ABSTRACT

An imaging system comprises a pixel array configured to generate a plurality of image charge voltage signals in response to incident light, and readout circuitry coupled to the pixel array, the readout circuitry including a plurality of column unit cells. Each column unit cell comprises at least one of a plurality of comparators, wherein each comparator is coupled to receive the ramp signal from the ramp generator through a ramp signal line. Each column unit cell also comprises a compensation current unit coupled to the ramp signal line, each compensation current unit comprising a compensation current source and a compensation current switch coupled to the compensation current source, wherein the compensation current source and the compensation current switch are coupled between a first node on the ramp signal line and a second node.

20 Claims, 10 Drawing Sheets

DISTRIBUTED RAMP LINEARITY COMPENSATION CIRCUIT

TECHNICAL FIELD

This disclosure relates generally to image sensors, and in particular but not exclusively, relates to complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
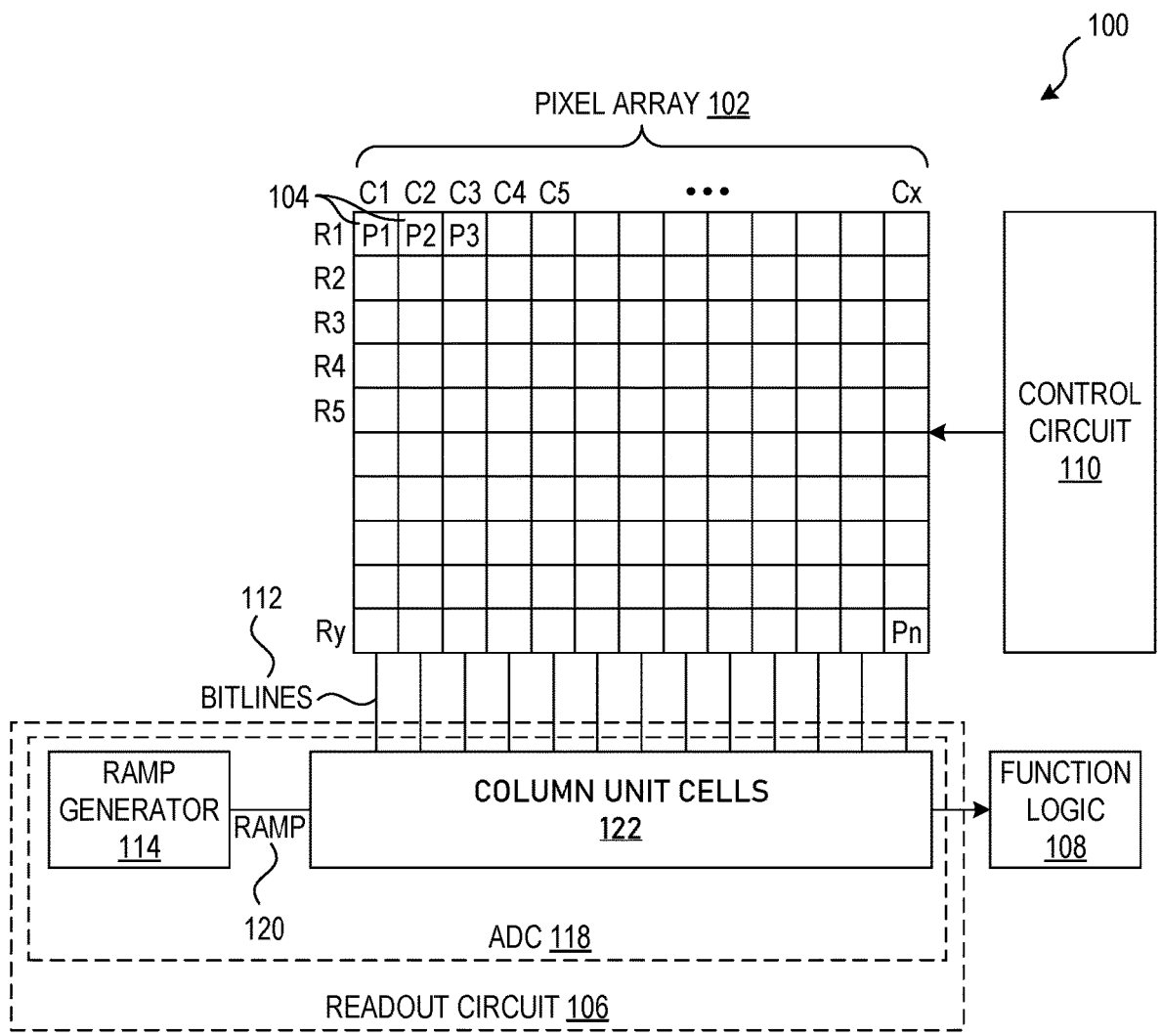
FIG. 1 illustrates one example of an imaging system including a pixel array in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with compensation current units distributed in a readout circuit providing improved ramp linearity are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with compensation current units distributed in a readout circuit providing improved ramp linearity are disclosed. In various examples, a readout circuit includes a plurality of column unit cells coupled to a ramp signal line to receive a ramp signal from a ramp generator, each column unit cell including a compensation current unit and one or more comparators. Each compensation current unit can include a compensation current source and a compensation current switch that can be toggled during the readout period.

In image sensors using single slope analog-to-digital conversion (ADC), nonlinearities in the ramp signal are detrimental to the performance of the image sensor. In conventional imaging systems, there is a large linearity error near the beginning of the ADC when the ramp signal starts to go up or down, depending on the polarity of the ramp signal. Existing methods for addressing this error include adding a step signal to the ramp signal and compensating the settling error in the ramp signal. However, one cause of the linearity error is the metal routing resistance ("parasitic resistance") inherent in the ramp signal line through which the ramp signal propagates, and the aforementioned methods involve changing the operation of the ramp generator, so the parasitic resistance remains an issue. As image sensor sizes increase with large format sensors, this metal routing resistance of ramp signal lines is not negligible.

In various examples of the present disclosure, a plurality of compensation current units is distributed in a readout circuit such that a compensation current unit is included in each column unit cell. In various examples, a compensation current unit is shared between multiple column unit cells. Each compensation current unit can be controlled (e.g., via a switch included in the compensation current unit) to locally draw or supply current from or to the ramp signal. In various examples, a local parasitic capacitance is charged locally by the current. In various examples, the charging current is localized and virtually does not flow through the parasitic resistance, thereby reducing IR-drop across the ramp signal line.

In various examples, an imaging system comprises a pixel array configured to generate a plurality of image charge voltage signals in response to incident light, and readout circuitry coupled to the pixel array, the readout circuitry including a plurality of column unit cells. Each column unit cell comprises at least one of a plurality of comparators (e.g., one comparator, two comparators, three comparators, . . . etc.), wherein each comparator is coupled to receive a corresponding one of the image charge voltage signals through a column bitline from the pixel array, compare the corresponding one of the image charge voltage signals to a ramp signal from a ramp generator, and provide a digital representation of the corresponding one of the image charge voltage signals in response, and wherein each comparator is coupled to receive the ramp signal from the ramp generator through a ramp signal line. Each column unit cell also comprises a compensation current unit coupled to the ramp signal line, each compensation current unit comprising a compensation current source and a compensation current switch coupled to the compensation current source, wherein the compensation current source and the compensation current switch are coupled between a first node on the ramp signal line and a second node.

To illustrate, FIG. 1 shows one example of an imaging system 100 having a readout circuit 106 including column unit cells 122 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., Pl, P2, . . . , Pn) that are arranged into rows (e.g., Rl to Ry) and columns (e.g., Cl to Cx) to acquire image data of a person, place, object, etc., which can then be used to render an image of a person, place, object, etc.

In various examples, the readout circuit 106 may be configured to read out the image charge voltage signals through the column bitlines 112. As will be discussed, in the various examples, readout circuit 106 may include an analog-to-digital converter (ADC). As shown in the depicted example, the ADC 118 is coupled to column bitlines 112 and is configured to convert analog signals from column bitlines 112 to digital signals. In various examples, column amplifiers may also be included and may be coupled to column bitlines 112 to amplify the analog signals received from column bitlines 112 for conversion to digital signals by ADC 118. In various examples, the ADC 118 includes a ramp generator 114 and column unit cells 122. The ramp generator 114 has a ramp generator output from which a ramp signal is provided to the column unit cells 122 via a ramp signal line 120. In the example, the digital image data values generated by the column unit cells 122 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
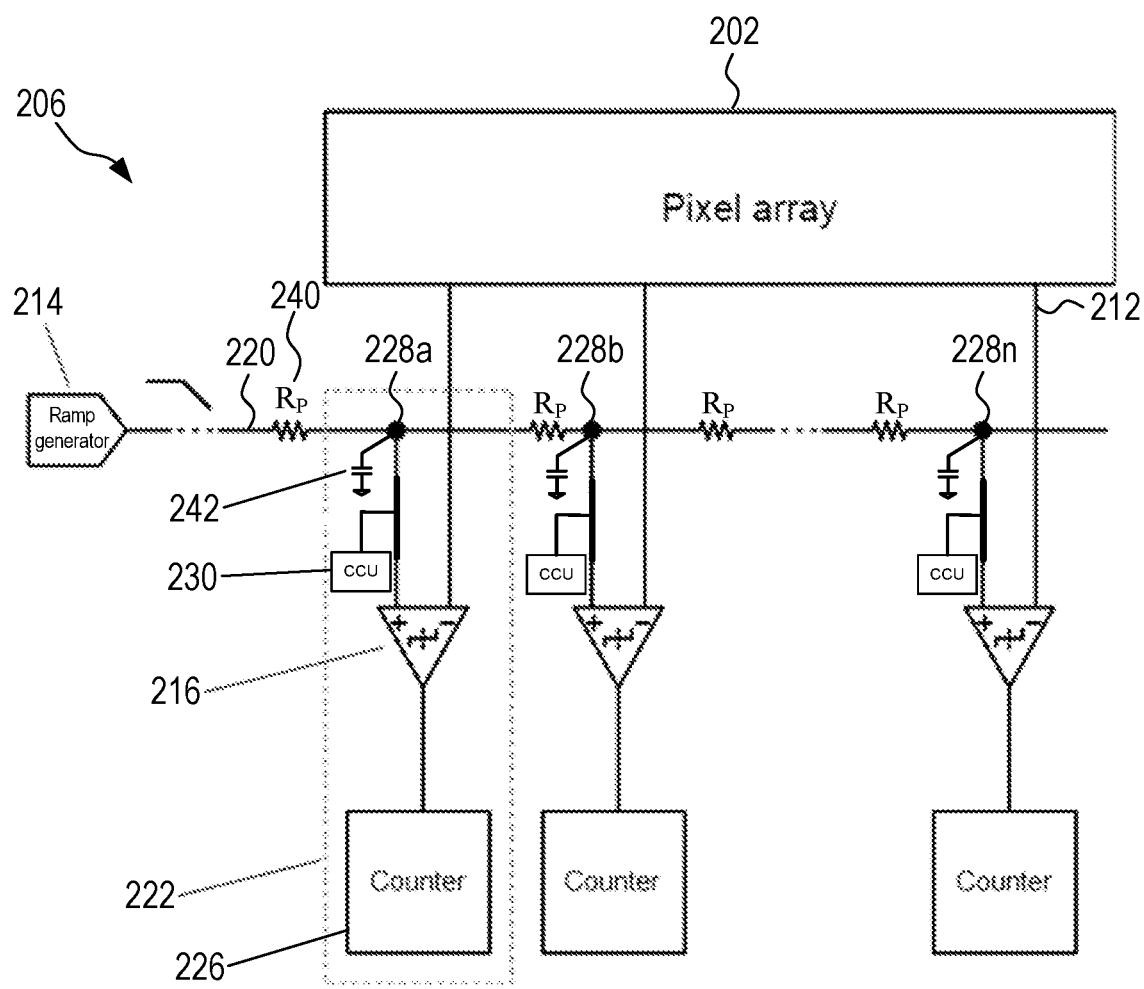
FIG. 2 illustrates a schematic of a portion of one example readout circuit including a compensation current unit in accordance with the teachings of the present disclosure.

FIG. 2 illustrates a schematic of a portion of one example readout circuit 206 including a compensation current unit 230 in accordance with the teachings of the present disclosure. It is appreciated that the readout circuit 206 of FIG. 2 may be an example of the readout circuit 106 included in the imaging system 100 as shown in FIG. 1, and that similarly named and numbered elements described above are coupled and function similarly below.

The readout circuit 206 can include a global ramp generator 214 configured to generate a ramp signal. The ramp signal is provided to a plurality of column unit cells 222 via a ramp signal line 220. In the illustrated embodiment, each column unit cell 222 includes at least one of a plurality of comparators 216. Thus, in one embodiment, each column unit cell 222 includes one comparator 216. In another embodiment, each column unit cell 222 may include two comparators 216, etc. Each comparator 216 can be coupled to receive an image charge voltage signal from a pixel array 202 via one of a plurality of bitlines 212, and the ramp signal from one of a plurality of nodes 228a, 228b, . . . 228n (collectively referred to as "nodes 228") along or on the ramp signal line 220. As shown in the depicted example, the ramp signal line 220 spans across the columns of pixel array 202 to provide the ramp signal to the plurality of column unit cells 222. Each comparator 216 can then compare the image charge voltage signal to the ramp signal and provide a digital representation of the image charge voltage signal in response. Each column unit cell 222 can include a compensation current unit (CCU) 230 and a represented local parasitic capacitance 242, both coupled to a respective one of the nodes 228 on the ramp signal line 220. The output of each comparator 216 is coupled to a counter 226 configured to be responsive to when the comparator 216 flips, indicating when the image charge voltage signal from the bitline 212 intersects the ramp signal from the ramp signal line 220. In various examples, each column unit cell 222 can further include a local ramp buffer coupled between the respective node 228 and the comparator 216.

In the illustrated embodiment, the column unit cells 222 are coupled to different ones of the nodes 228 on the ramp signal line 220. In practice, the ramp signal line 220 has inherent metal routing resistance ("parasitic resistance") $R_P$ 240 along its length. This parasitic resistance $R_P$ 240 can cause a linearity error in the ramp signal near the beginning of the ADC when the ramp signal starts to go up or down, depending on the polarity of the ramp signal. This linearity error is greater for column unit cells 222 coupled further along the ramp signal line 220. As will be described in further detail below, the compensation current units 230, which are distributed among the column unit cells 222 along ramp signal line 220 across pixel array 202, can be controlled to locally draw or supply current from or to the ramp signal and reduce change in current flow through the parasitic resistance $R_P$ 240 along the ramp signal line 220 in accordance with the teachings of the present disclosure.

Figure 3:
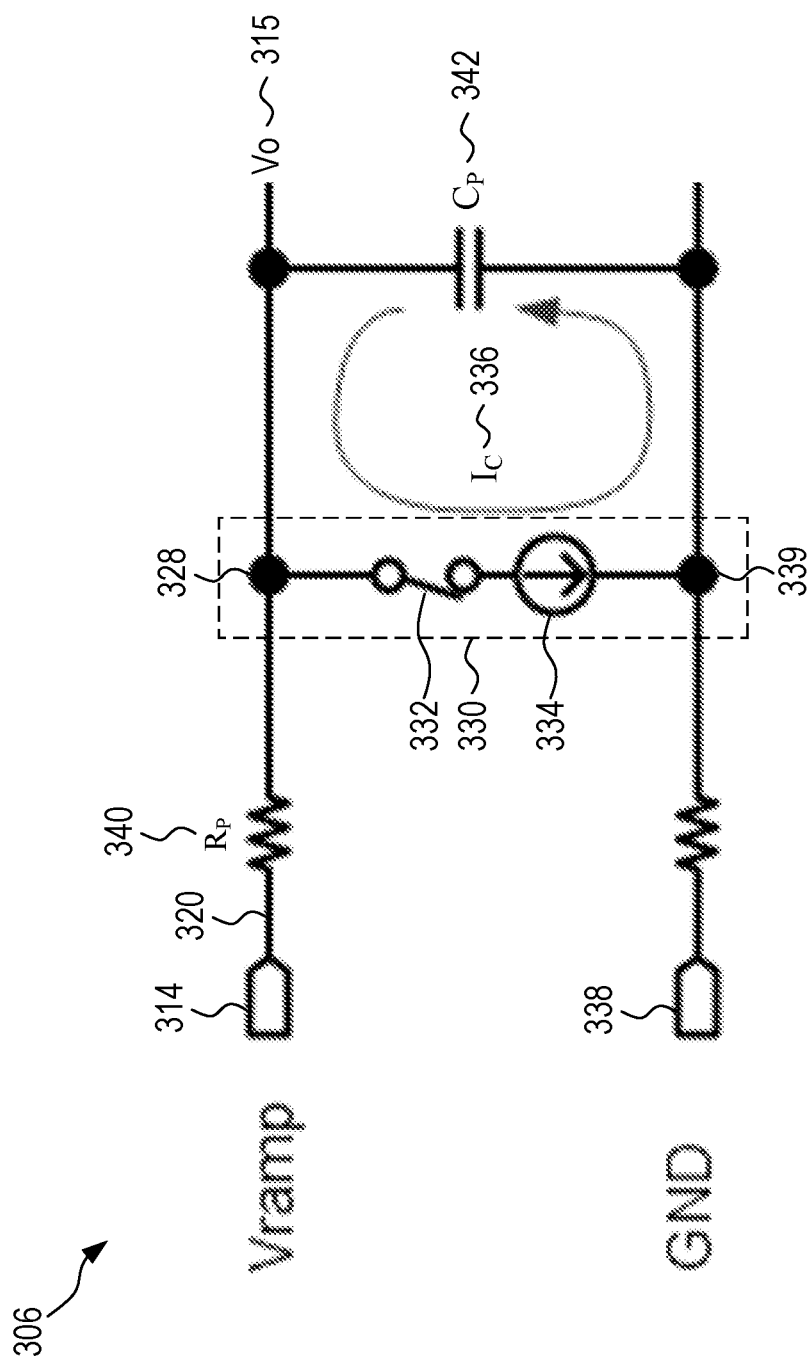
FIG. 3 illustrates a schematic of a portion of one example readout circuit including a compensation current unit in accordance with the teachings of the present disclosure.

FIG. 3 illustrates a schematic of a portion of one example readout circuit 306 including a compensation current unit 330 in accordance with the teachings of the present disclosure. It is appreciated that the compensation current unit 330 of FIG. 3 may be an example of one of the compensation current units 230 as shown in FIG. 2, and that similarly named and numbered elements described above are coupled and function similarly below.

In the illustrated embodiment, the compensation current unit 330 and a represented local parasitic capacitance $C_P$ 342 can be included in a column unit cell. A ramp signal generated by a ramp generator 314 can propagate along ramp signal line 320 to output node VO 315, which can be coupled to an input of a comparator (e.g., the comparator 216 illustrated in FIG. 2). The compensation current unit 330 can include a compensation current source 334 and a compensation current switch 332 coupled to the compensation current source 334. The compensation current source 334 and the compensation current switch 332 are coupled between a first node 328, which is on the ramp signal line 320, and a second node 339, which is coupled to ground 338. When the compensation current switch 332 is turned off, the compensation current source 334 is part of an open circuit so there is no current flowing. When the compensation current switch 332 is turned on, the compensation current source 334 can draw or supply current $I_C$ 336 from or to the ramp signal line 320 to locally charge/discharge the local parasitic capacitance 342. Since both the compensation current unit 330 and the local parasitic capacitance 342 are coupled to the ramp signal line 320 and ground 338, current $I_C$ 336 flows only locally and there is virtually no current flowing to ground 338 or through the parasitic resistance $R_P$ 340 along the ramp signal line 320. In particular, reducing current flow to ground 338 can reduce power line noise (e.g., linearity or horizontal noise to ground 338), which can affect image quality.

Figure 4:
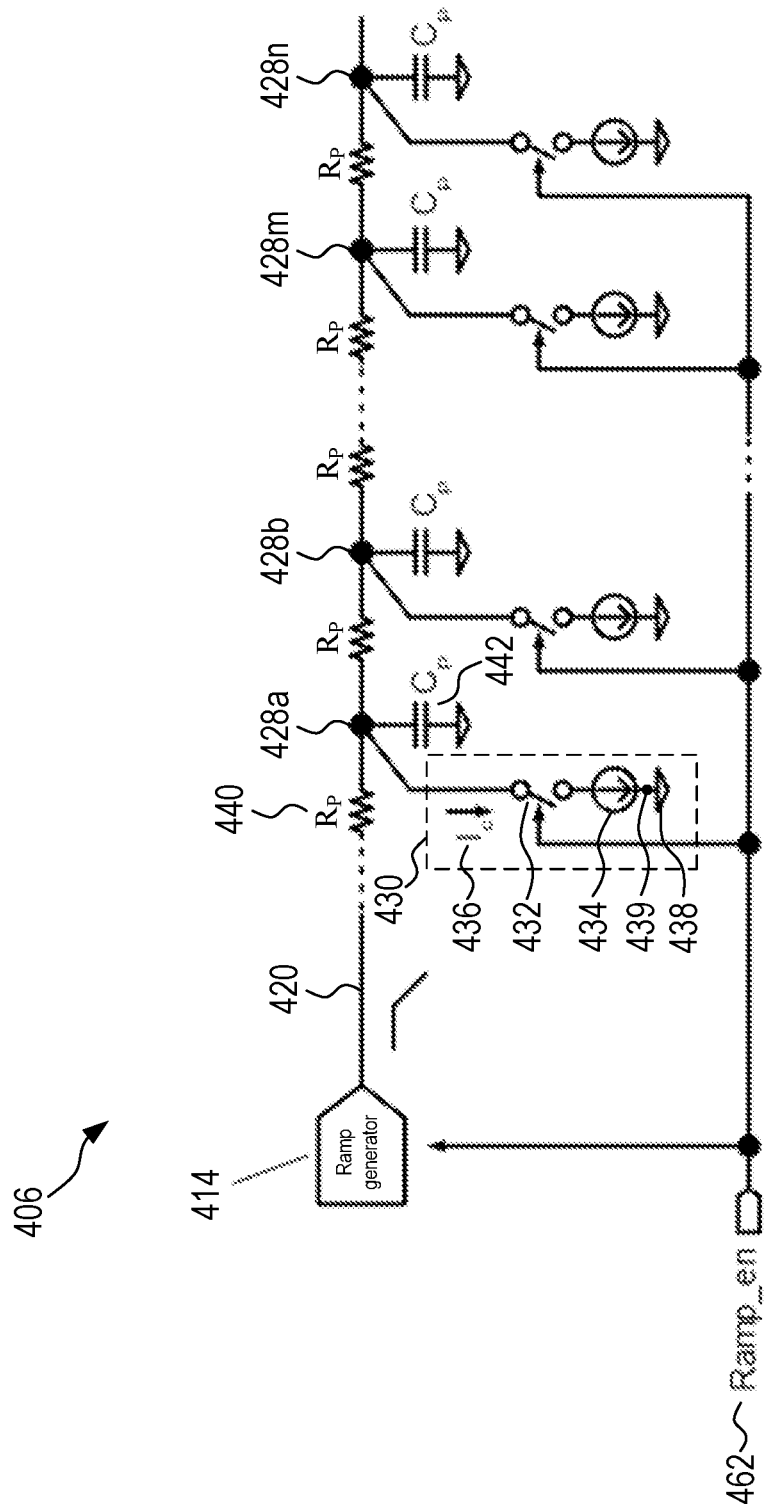
FIG. 4 illustrates a schematic of a portion of one example readout circuit including compensation current units in accordance with the teachings of the present disclosure.

FIG. 4 illustrates a schematic of a portion of one example readout circuit 406 including compensation current units 430 in accordance with the teachings of the present disclosure. It is appreciated that the compensation current units 430 of FIG. 4 may be an example of the compensation current unit 230 as shown in FIG. 2, and that similarly named and numbered elements described above are coupled and function similarly below.

In the illustrated embodiment, each of the compensation current units 430 and represented local parasitic capacitance $C_P$ 442 can be included in a column unit cell. Each compensation current unit 430 can include a compensation current source 434 and a compensation current switch 432 coupled to the compensation current source 434. The compensation current source 434 and the compensation current switch 432 are coupled between a first node 428a/b/ . . . /m/n, which is on a ramp signal line 420 coupled to propagate a ramp signal generated by a ramp generator 414, and a second node 439, which is coupled to ground 438. The compensation current switch 432 can be configured to be controlled by a switch signal Ramp_en 462. In the illustrated embodiment, all of the compensation current switches 432 are configured to be controlled by the same switch signal Ramp_en 462.

When the compensation current switch 432 is turned off, the compensation current source 434 is part of an open circuit so there is no current flowing. When the compensation current switch 432 is turned on, the compensation current source 434 can draw or supply current $I_C$ 436 from or to the ramp signal line 420 to charge/discharge the local parasitic capacitance 442. Since both the compensation current unit 430 and the local parasitic capacitance 442 are coupled to the ramp signal line 420 and ground 438, current $I_C$ 436 flows only locally and there is virtually no current flowing to ground 438 or through the parasitic resistance $R_P$ 440 along the ramp signal line 420.

Figure 5:
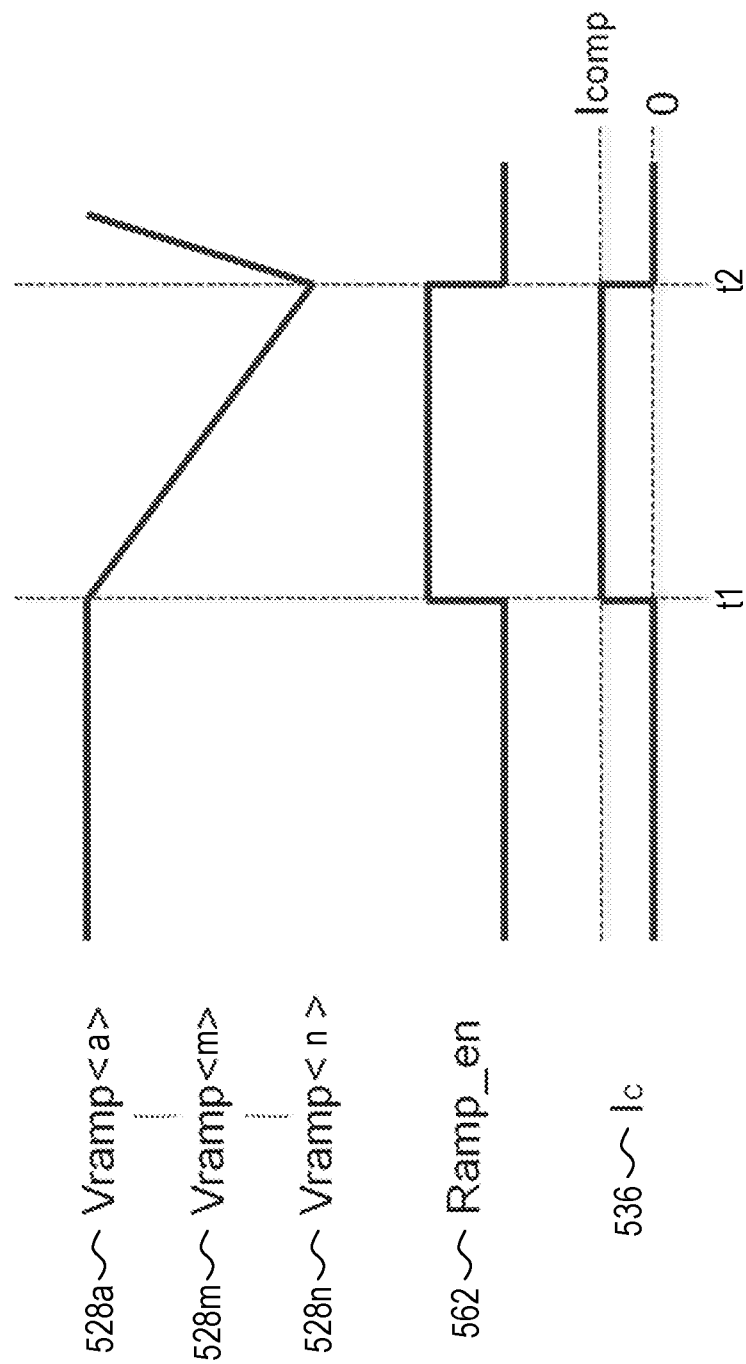
FIG. 5 illustrates a readout period timing diagram of a compensation current unit in an example readout circuit in accordance with the teachings of the present disclosure.

FIG. 5 illustrates a readout period timing diagram of a compensation current unit in an example readout circuit in accordance with the teachings of the present disclosure. It is appreciated that the timing diagram of FIG. 5 may be an example timing diagram used to operate the compensation current unit 430 as shown in FIG. 4, and that similarly named and numbered elements described above are coupled and function similarly below.

In the illustrated timing diagram, the switch signal Ramp_en 562 is configured to remain off prior to the ramping period (i.e., between times t1 and t2) of the ramp signal. At time t1, the switch signal Ramp_en 562 is toggled to turn on such that a compensation current source (e.g., the compensation current source 434 illustrated in FIG. 4) can draw or supply current $I_C$ 536 from or to a ramp signal line (e.g., the ramp signal line 420) to charge a local parasitic capacitance (e.g., the local parasitic capacitance 442) as the ramp signal goes down. The switch signal Ramp_en 562 can be configured to remain on during the entire ramping period, and toggled to turn off at time t2, which causes the current $I_C$ 536 to drop back to zero as the ramp signal returns to its nominal voltage level.

As discussed above with respect to FIGS. 3 and 4, by locally drawing or supplying current $I_C$ 536 from or to the ramp signal line, local parasitic capacitance can be locally charged and current flow through parasitic resistance on the ramp signal line can be virtually avoided. Therefore, the linearity error at the beginning of the ramping period can be reduced. Furthermore, there is negligible IR drop along the ramp signal line so the voltage values at various nodes along the ramp signal line (e.g., Vramp<a> 528a, Vramp<m> 528m, Vramp<n> 528n) can be equivalent throughout the ADC period, as shown in FIG. 5. In other embodiments, it is appreciated that the polarity of the ramp signal and the polarity of corresponding circuit elements can be flipped such that the ramp signal goes up beginning at time t1 in accordance with the teachings of the present disclosure.

Figure 6A:
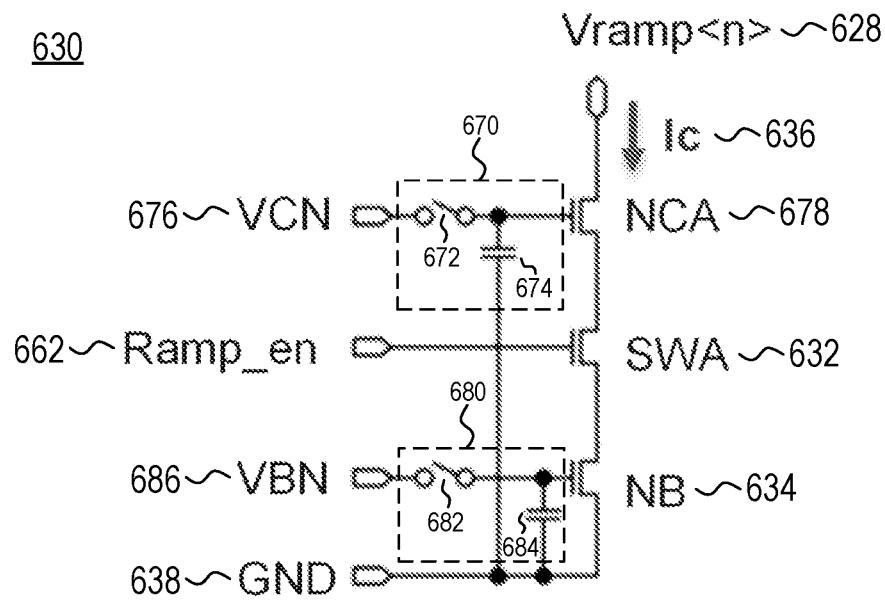
FIGS. 6A, 6B, and 6C illustrate schematics of three example compensation current units in accordance with the teachings of the present disclosure.
Figure 6B:
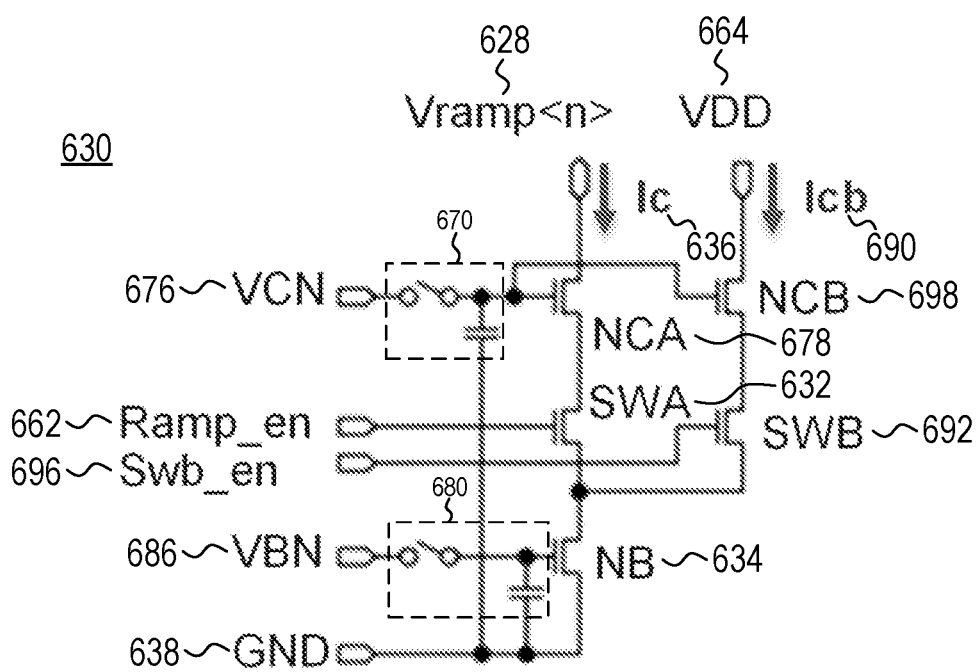
Figure 6C:
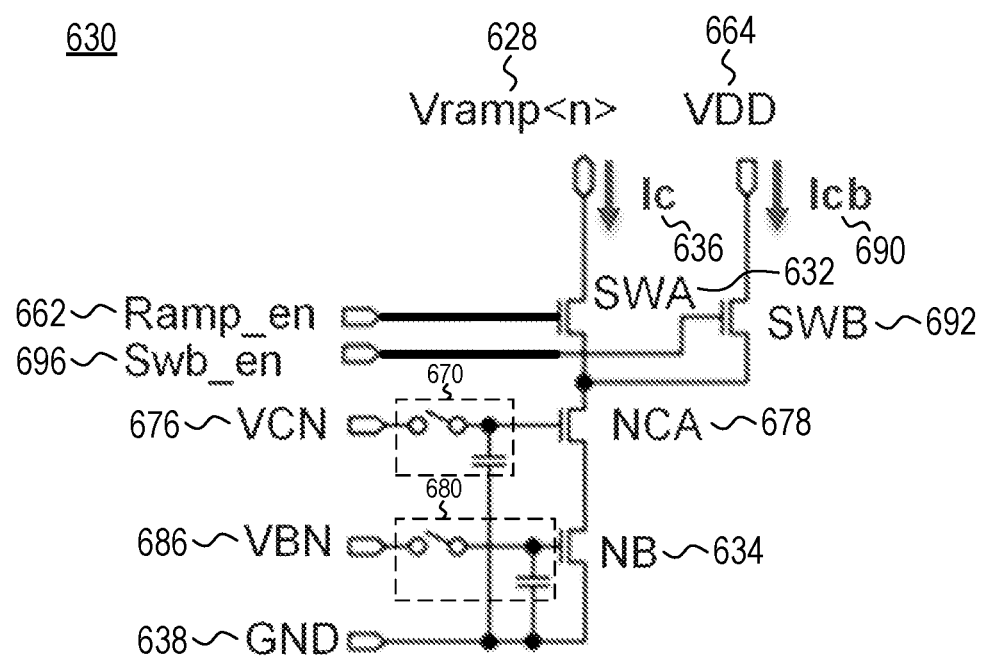

FIGS. 6A, 6B, and 6C illustrate schematics of three example compensation current units 630 in accordance with the teachings of the present disclosure. It is appreciated that the compensation current units 630 of FIGS. 6A, 6B, and 6C may be examples of the compensation current unit 230 as shown in FIG. 2, and that similarly named and numbered elements described above are coupled and function similarly below.

Referring first to FIG. 6A, the compensation current unit 630 includes a compensation current source NB 634 and a first compensation current switch SWA 632 coupled between an output node Vramp<n> 628 on a ramp signal line (e.g., the ramp signal line 420 illustrated in FIG. 4) and ground 638. The compensation current source NB 634 can be a transistor (e.g., an NMOS transistor) with a gate terminal coupled to a bias voltage source VBN 686. The first compensation current switch SWA 632 can be a transistor (e.g., an NMOS transistor) with a gate terminal coupled to be controlled by a first switch signal Ramp_en 662. When the first switch signal Ramp_en 662 is toggled on, the compensation current source NB 634 can draw or supply current $I_C$ 636 from or to the output node Vramp<n> 628 on the ramp signal line.

In various examples, the compensation current unit 630 can also include a first cascode device NCA 678 coupled to the first compensation current switch SWA 632 such that the compensation current source NB 634, the first compensation current switch SWA 632, and the first cascode device NCA 678 are coupled between the output node Vramp<n> 628 and ground 638. The first cascode device NCA 678 can be a transistor (e.g., an NMOS transistor) with a gate terminal coupled to a bias voltage source VCN 676. During a readout period, the first cascode device NCA 678 can at least partially decouple (i.e., electrically separate) the first compensation current switch SWA 632 from the output node Vramp<n> 628 on the ramp signal line such that the channel capacitance of the first compensation current switch SWA 632 does not affect the settling of the ramp signal at the output node Vramp<n> 628. In various examples, the first cascode device NCA 678 can be coupled between the compensation current source NB 634 and the first compensation current switch SWA 632 instead.

In various examples, the compensation current unit 630 can further include a first sample and hold circuit (SHC) 670 coupled between the bias voltage source VCN 676 and the first cascode device NCA 678. The first SHC can include a capacitor 674 coupled between the cascode device NCA 678 and ground 638 and a SHC switch 672 coupled between the bias voltage source VCN 676 and the first cascode device NCA 678. In various examples, the compensation current unit 630 can further include a second SHC 680 coupled between the bias voltage source VBN 686 and the compensation current source NB 634. The second SHC can include a capacitor 684 coupled between the compensation current source NB 634 and ground 638 and a SHC switch 682 coupled between the bias voltage source VBN 686 and the compensation current source NB 634. Each of the first and second SHCs 670, 680 can be configured to at least partially decouple the output node Vramp<n> 628 from the bias voltage source VCN 676 or the bias voltage source VBN 686, respectively, such that noise does not propagate from the bias voltage sources to the output during the readout period.

Referring next to FIG. 6B, the compensation current unit 630 is generally similar to the embodiment illustrated in FIG. 6A, but with an additional "branch" coupled to a node between the compensation current source NB 634 and the first compensation current switch SWA 632. The branch includes a second compensation current switch SWB 692 coupled between the compensation current source NB 634 and a power line VDD 664. The second compensation current switch SWB 692 can be a transistor (e.g., an NMOS transistor) with a gate terminal coupled to be controlled by a second switch signal Swb_en 696. In various embodiments, the branch can further include a second cascode device NCB 698 coupled to the second compensation current switch SWB 692. The second cascode device NCB 698 can be a transistor (e.g., an NMOS transistor) with a gate terminal coupled to the same bias voltage source VCN 676 as the first cascode device NCA 678. In other embodiments, the first and second cascode devices NCA 678, NCB 698 can have gate terminals coupled to different bias voltage sources. The second compensation current switch SWB 692 can be toggled to allow a pre-charging current $I_{CB}$ 690 to flow to the compensation current source NB 634. As will be described in greater detail below with respect to FIG. 7, the branch can reduce a delay in the current $I_C$ 636 during the readout period.

Referring next to FIG. 6C, the compensation current unit 630 is generally similar to the embodiment illustrated in FIG. 6B, but with the second cascode device NCB 698 "merged" into the first cascode device NCA 678. Further, the cascode device NCA 678 is coupled between the compensation current source NB 634 and each of the first and second compensation current switches SWA 632, SWB 692.

In various examples, ground 638 can be replaced with a non-zero voltage source, as will be described in greater detail below with respect to FIGS. 8 and 9. Accordingly, the compensation current source NB 634, the first and second compensation current switches SWA 632, SWB 692, and/or the first and second cascode devices NCA 678, NCB 698 can be PMOS transistors.

Figure 7:
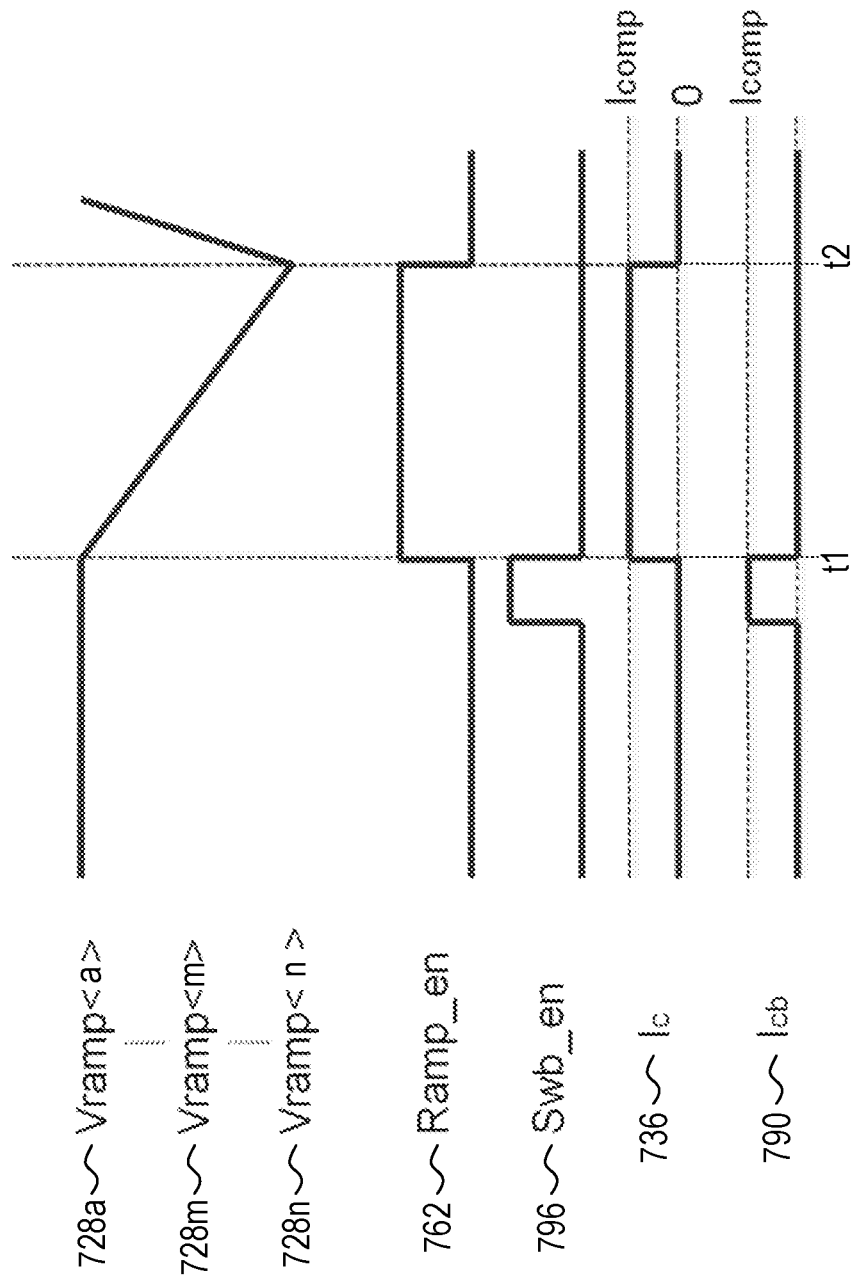
FIG. 7 illustrates a readout period timing diagram of a compensation current unit in an example readout circuit in accordance with the teachings of the present disclosure.

FIG. 7 illustrates a readout period timing diagram of a compensation current unit in an example readout circuit in accordance with the teachings of the present disclosure. It is appreciated that the timing diagram of FIG. 7 may be an example timing diagram used to operate the compensation current unit 630 as shown in FIG. 6B, and that similarly named and numbered elements described above are coupled and function similarly below.

In the illustrated timing diagram, a second switch signal Swb_en 796 can be configured to be pulsed before the ramping period (i.e., between times t1 and t2). Accordingly, a pre-charging current $I_{CB}$ 790 can flow to a compensation current source (e.g., the compensation current source NB 634 illustrated in FIG. 6B). At time t1, the second switch signal Swb_en 796 can be toggled off while a first switch signal Ramp_en 762 can be toggled on to allow the compensation current source to draw or supply current $I_C$ 736 from or to a corresponding node Vramp<a> 728a, Vramp<m> 728m, Vramp<n> 728n on the ramp signal line. At time t2 (i.e., the end of the ramping period), the first switch signal Ramp_en 762 can be toggled off, which causes the current $I_C$ 736 to drop back to zero as the ramp signal returns to its nominal voltage level.

The circuitry and timing diagram illustrated in FIGS. 6B and 7, respectively, provide an advantage over the circuitry illustrated in FIG. 6A. Referring back to FIG. 6A, while the first switch signal Ramp_en 662 remains off prior to the ramping period, the voltage level at the drain terminal of the compensation current source 634 can be pulled down to ground because the compensation current source is still configured to conduct current. When the first switch signal Ramp_en 662 is toggled on at time t1, the voltage level at the drain terminal of the compensation current source 634 begins to increase (or decrease, depending on the polarity) and eventually reaches a certain voltage level at which the compensation current source 634 can draw or supply the ideal current $I_C$ 636 for compensation. However, while the voltage level at the drain terminal of the compensation current source 634 is changing, the first cascode device NCA 678 can draw an excessively large current and cause undesirable disturbance on the node Vramp<n> 628 on the ramp signal line.

The additional "branch" illustrated in FIG. 6B can address this issue. Pulsing the second switch signal Swb_en 696/796 prior to the ramping period, as shown in FIG. 7, allows the compensation current source NB 634 to draw the pre-charging current $I_{CB}$ 690, which can pre-charge the drain terminal of the compensation current source 634 prior to the ramping period. Then, at time t1 when the second switch signal Swb_en 696/796 is toggled off and the first switch signal Ramp_en 662/762 is toggled on, the compensation current source NB 634 can switch to drawing or supplying the current $I_C$ 636 with a smaller change in the voltage level at the drain terminal of the compensation current source 634, reducing a delay in the optimal current $I_C$ 636 and reducing any undesirable disturbance on the node Vramp<n> 628 on the ramp signal line.

Figure 8:
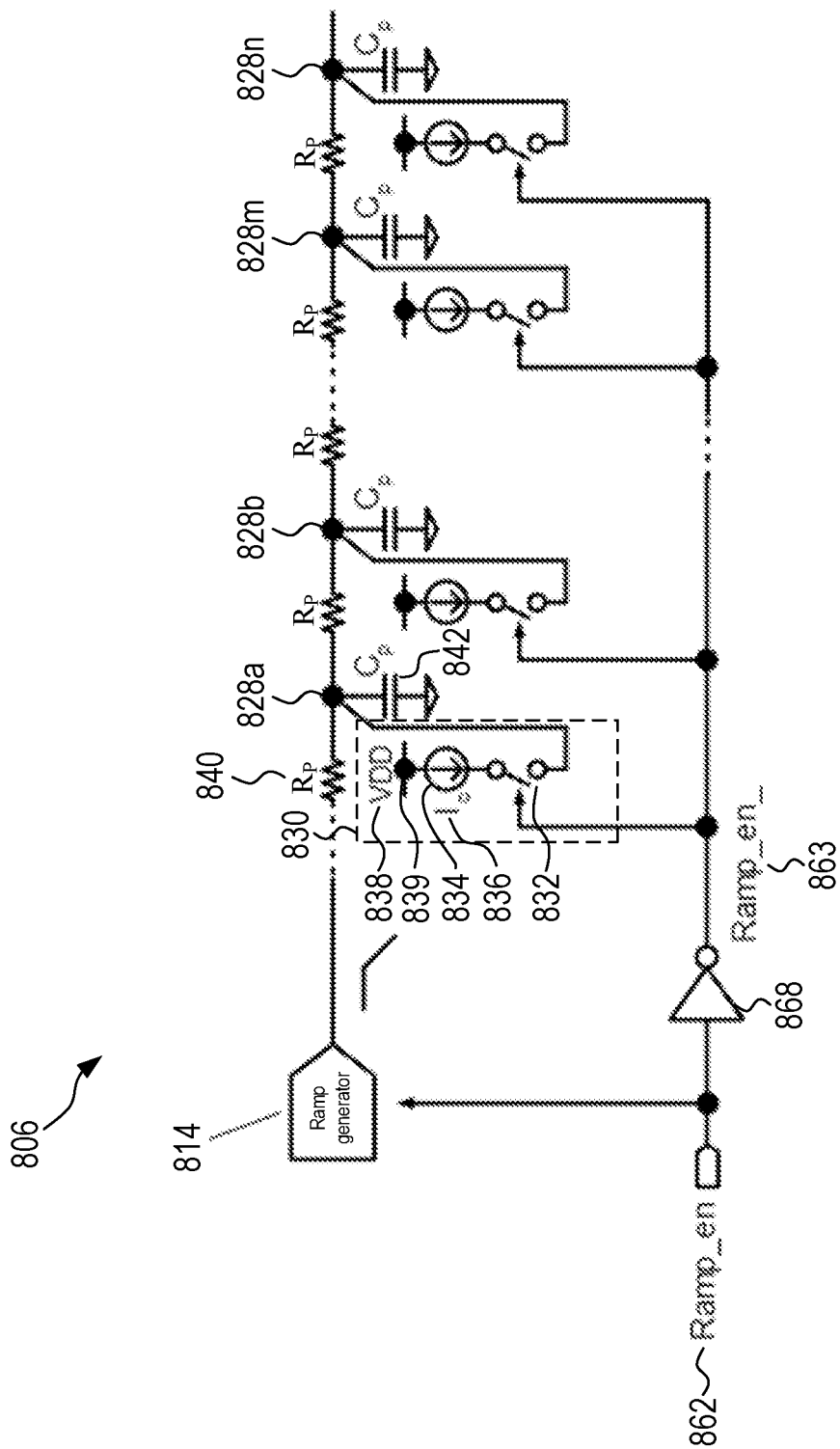
FIG. 8 illustrates a schematic of a portion of one example readout circuit including compensation current units in accordance with the teachings of the present disclosure.

FIG. 8 illustrates a schematic of a portion of one example readout circuit including a compensation current unit in accordance with the teachings of the present disclosure. It is appreciated that the compensation current units 830 of FIG. 8 may be an example of the compensation current unit 230 as shown in FIG. 2, and that similarly named and numbered elements described above are coupled and function similarly below.

In the illustrated embodiment, each of the compensation current units 830 and represented local parasitic capacitance $C_P$ 842 can be included in a column unit cell. Each compensation current unit 830 can include a compensation current source 834 and a compensation current switch 832 coupled to the compensation current source 834. The compensation current source 834 and the compensation current switch 832 are coupled between a first node 828a/b/.../m/n, which is on the ramp signal line 820 coupled to a ramp generator 814, and a second node 839, which is coupled to a non-zero voltage source (i.e., a power line) VDD 838. The compensation current switch 832 can be configured to be controlled by an inverted switch signal Ramp_en_863. The inverted switch signal Ramp_en_863 can be an inverted signal of a non-inverted switch signal Ramp_en 862 (e.g., via an inverter 868). In the illustrated embodiment, all of the compensation current switches 832 are configured to be controlled by the same inverted switch signal Ramp_en_863.

Figure 9:
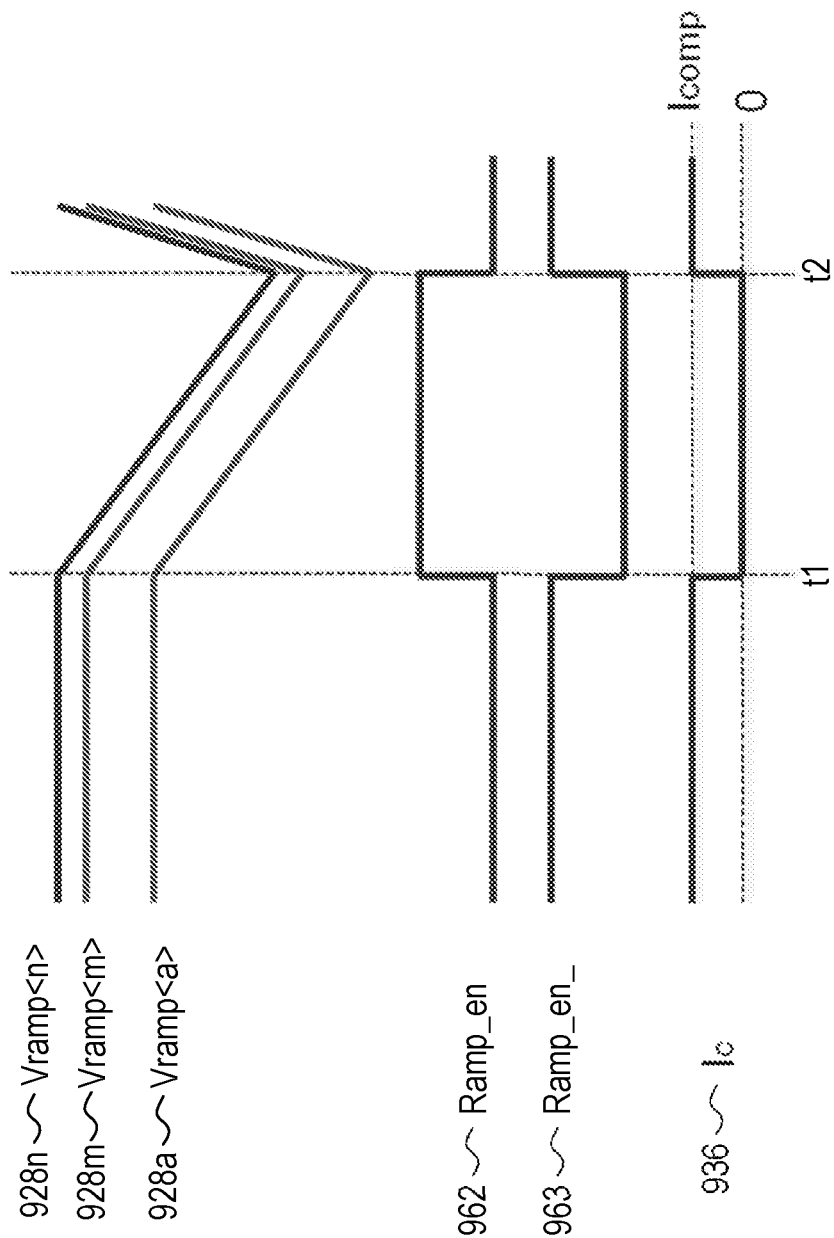
FIG. 9 illustrates a readout period timing diagram of a compensation current unit in an example readout circuit in accordance with the teachings of the present disclosure.

FIG. 9 illustrates a readout period timing diagram of a compensation current unit in an example readout circuit in accordance with the teachings of the present disclosure. It is appreciated that the timing diagram of FIG. 9 may be an example timing diagram used to operate the compensation current unit 830 as shown in FIG. 8, and that similarly named and numbered elements described above are coupled and function similarly below.

In the illustrated timing diagram, inverted switch signal Ramp_en_963 is the inverted form of non-inverted switch signal Ramp_en 962. Prior to the ramping period (i.e., before time t1), the inverted switch signal Ramp_en_963 can be configured to remain on, allowing a compensation current source (e.g., the compensation current source 834) to draw current $I_C$ 936 from a power line (e.g., VDD 838) and supply the current $I_C$ 936 to a ramp generator (e.g., the ramp generator 814). Then at time t1 (i.e., the beginning of the ramping period), the inverted switch signal Ramp_en_963 can be toggled off such that the compensation current unit (e.g., the compensation current unit 830) is disabled and the ramp generator charges a local parasitic capacitance (e.g., the local parasitic capacitance 842). At time t2 (i.e., the end of the ramping period), the inverted switch signal Ramp_en_963 can be toggled back on such that current $I_C$ 936 flows once again.

Compared to the embodiments illustrated in FIGS. 3-7, the embodiments illustrated in FIGS. 8 and 9 may have drawbacks. One drawback is that, because the compensation current unit 830 and the local parasitic capacitance 842 are coupled to different voltage levels (i.e., VDD 838 and ground, respectively), toggling the inverted switch signal Ramp_en_863/963 can change the currents at those respective voltage level nodes, causing power line noise (e.g., linearity or horizontal noise) that affects image quality. Another drawback is that there can be an IR-drop along the ramp signal line 820 due to the current $I_C$ 936 flowing prior to time t1, as illustrated in FIG. 9 by the varying voltage levels at the nodes Vramp<n> 928n, Vramp<m> 928m, and Vramp<a> 928a. In various examples, the IR-drop can remain constant during the ADC period, however, because the charging current supplied by the ramp generator 814 during the ADC period can be configured to be equal to the current $I_C$ 836/936 supplied to the ramp generator 814 during non-ADC periods (e.g., before time t1), thereby reducing or removing changes in the current flowing through the ramp signal line 820. An advantage of the embodiments illustrated in FIGS. 8 and 9 is that the compensation current source 834 is disabled during the ADC period, so there is no need for designs to account for random noise, current consistency, etc. as the ramp signal and the current conducted by the compensation current source flow simultaneously in the readout circuit. Another advantage is that in various embodiments, the settling time can be shortened.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. An imaging system, comprising:
a pixel array configured to generate a plurality of image charge voltage signals in response to incident light; and
readout circuitry coupled to the pixel array, the readout circuitry including a plurality of column unit cells, wherein each column unit cell comprises:
at least one of a plurality of comparators, wherein each comparator is coupled to receive a corresponding one of the image charge voltage signals from the pixel array, compare the corresponding one of the image charge voltage signals to a ramp signal from a ramp generator, and provide a digital representation of the corresponding one of the image charge voltage signals in response, and wherein each comparator is coupled to receive the ramp signal from the ramp generator through a ramp signal line; and
a compensation current unit coupled to the ramp signal line, comprising:
a compensation current source; and
a compensation current switch coupled to the compensation current source,
wherein the compensation current source and the compensation current switch are coupled between a first node on the ramp signal line and a second node.

2. The imaging system of claim 1, wherein each column unit cell further includes a local parasitic capacitance coupled to the first node, wherein each compensation current unit is configured to locally conduct current that is conducted through the local parasitic capacitance of the respective column unit cell.

3. The imaging system of claim 1, wherein each compensation current unit further comprises a sample and hold circuit coupled between the compensation current source and a bias voltage source.

4. The imaging system of claim 1, wherein each compensation current unit further comprises a cascade device coupled to the compensation current switch, wherein the compensation current source, the cascade device, and the compensation current switch are coupled between the first node and the second node.

5. The imaging system of claim 4, wherein the cascade device is coupled between the first node and the compensation current switch.

6. The imaging system of claim 4, wherein each compensation current unit further comprises a sample and hold circuit coupled between the cascade device and a bias voltage source.

7. The imaging system of claim 1, wherein the compensation current switch is a first compensation current switch, wherein each compensation current unit further comprises a second compensation current switch coupled between the compensation current source and a power line.

8. The imaging system of claim 7, wherein each compensation current unit further comprises a cascade device coupled to the second compensation current switch, wherein the cascade device, the second compensation current switch, and the compensation current source are coupled between the power line and the second node.

9. The imaging system of claim 1, wherein each second node is coupled to ground.

10. The imaging system of claim 1, wherein each second node is coupled to a non-zero voltage value.

11. The imaging system of claim 1, wherein the compensation current unit of each column unit cell is separate from the ramp generator.

12. The imaging system of claim 1, wherein the compensation current unit of each column unit cell is configured, when activated, to draw or supply current from or to the ramp signal line.

13. The imaging system of claim 1, wherein the compensation current unit of each column unit cell is configured, when activated to locally conduct current such that a negligible amount of current flows through a parasitic resistance on the ramp signal line.

14. A method of operating an imaging system, comprising:
coupling a plurality of column unit cells to a pixel array, wherein each column unit cell comprises:
at least one of a plurality of comparators, wherein each comparator is coupled to receive a ramp signal from a ramp generator through a ramp signal line; and
a compensation current unit coupled to the ramp signal line, comprising:
a compensation current source; and
a compensation current switch coupled to the compensation current source,
wherein the compensation current switch is configured to be controlled by a switch signal, and
wherein the compensation current source and the compensation current switch are coupled between a first node on the ramp signal line and a second node;
toggling each switch signal at a beginning of a ramping period; and
toggling each switch signal at an end of the ramping period, thereby causing the compensation current source to generate a compensation current.

15. The method of claim 14, wherein each column unit cell further comprises a local parasitic capacitance coupled to the first node, and wherein toggling each switch signal at the beginning and the end of the ramping period causes, in each respective column unit, the compensation current to be locally conducted through the local parasitic capacitance.

16. The method of claim 14, wherein the compensation current switch is a first compensation current switch, wherein the switch signal is a first switch signal, wherein each compensation current unit further comprises a second compensation current switch coupled between the compensation current source and a power line, wherein the second compensation current switch is configured to be controlled by a second switch signal, the method further comprising:
pulsing the second switch signal prior to the beginning of the ramping period, thereby precharging the compensation current source prior to the beginning of the ramping period and reducing a delay of the compensation current.

17. The method of claim 16, pulsing the second switch signal comprises turning off the second switch signal at the beginning of the ramping period.

18. The method of claim 14, wherein each second node is coupled to ground, wherein toggling the switch signal at the beginning of the ramping period comprises turning on the switch signal at the beginning of the ramping period, and wherein toggling the switch signal at the end of the ramping period comprises turning off the switch signal at the end of the ramping period.

19. The method of claim 14, wherein each second node is coupled to a non-zero voltage value, wherein toggling the switch signal at the beginning of the ramping period comprises turning off the switch signal at the beginning of the ramping period, and wherein toggling the switch signal at the end of the ramping period comprises turning on the switch signal at the end of the ramping period.

20. An imaging system, comprising:

a pixel array; and readout circuitry coupled to the pixel array, the readout circuitry including a plurality of column unit cells, each column unit cell of the plurality coupled to receive a ramp signal from a ramp generator via a ramp signal line, wherein each column unit cell includes— a comparator configured to compare image charge voltage signals received from the pixel array to the ramp signal received from the ramp generator, and a compensation current unit having (a) a compensation current source and (b) a compensation current switch configured to selectively couple the compensation current source to the ramp signal line.

\* \* \* \* \*